(12) United States Patent
Suzuki et al.

(10) Patent No.: US 7,037,483 B2
(45) Date of Patent: May 2, 2006

(54) PROCESS FOR PRODUCING HIGH-PRESSURE HYDROGEN AND SYSTEM FOR PRODUCING HIGH-PRESSURE HYDROGEN

(75) Inventors: Takanori Suzuki, Wako (JP); Izuru Kanoya, Wako (JP); Mitsuya Hosoe, Wako (JP); Takeaki Isobe, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 343 days.

(21) Appl. No.: 10/419,989

(22) Filed: Apr. 22, 2003

(65) Prior Publication Data

US 2004/0018145 A1   Jan. 29, 2004

(30) Foreign Application Priority Data

Apr. 23, 2002 (JP) ............................. 2002-121158
Sep. 19, 2002 (JP) ............................. 2002-272661

(51) Int. Cl.
*C01B 3/06* (2006.01)
*C01B 3/08* (2006.01)
*C01B 3/10* (2006.01)

(52) U.S. Cl. .................... 423/648.1; 423/657; 423/658
(58) Field of Classification Search ................ 423/357, 423/657, 658, 648.1
See application file for complete search history.

(56) References Cited

U.S. PATENT DOCUMENTS

| 3,932,600 | A | * | 1/1976 | Gutbier et al. ............... 423/657 |
| 3,957,483 | A | * | 5/1976 | Suzuki ....................... 427/180 |
| 4,950,460 | A | * | 8/1990 | Goodwin et al. ........... 422/239 |
| 6,184,432 | B1 | * | 2/2001 | Thomas ....................... 588/316 |
| 6,506,360 | B1 | * | 1/2003 | Andersen et al. ........... 423/657 |
| 6,638,493 | B1 | * | 10/2003 | Andersen et al. ........... 423/657 |
| 6,899,862 | B1 | * | 5/2005 | Baldwin et al. ............ 423/657 |
| 2002/0048548 | A1 | * | 4/2002 | Chaklader ................... 423/657 |
| 2004/0131541 | A1 | * | 7/2004 | Andersen .................... 423/657 |

FOREIGN PATENT DOCUMENTS

| JP | 9-266006 | 10/1999 |
| JP | 11-283633 | 10/1999 |

* cited by examiner

*Primary Examiner*—Wayne A. Langel
(74) *Attorney, Agent, or Firm*—Arent Fox PLLC

(57) ABSTRACT

To produce high-pressure hydrogen, water and a hydrogen-generating material ($MgH_2$) which reacts with water to generate hydrogen are weighed so that a target high hydrogen pressure is generated in a high-pressure container. Then, the hydrogen-generating material is introduced into the high-pressure container through its supply port, and water is introduced into the high-pressure container through the supply port. Thereafter, the supply port is closed, thereby causing a reaction between the hydrogen-generating material and the water, so that the hydrogen pressure in the high-pressure container reaches a target high hydrogen pressure.

3 Claims, 11 Drawing Sheets

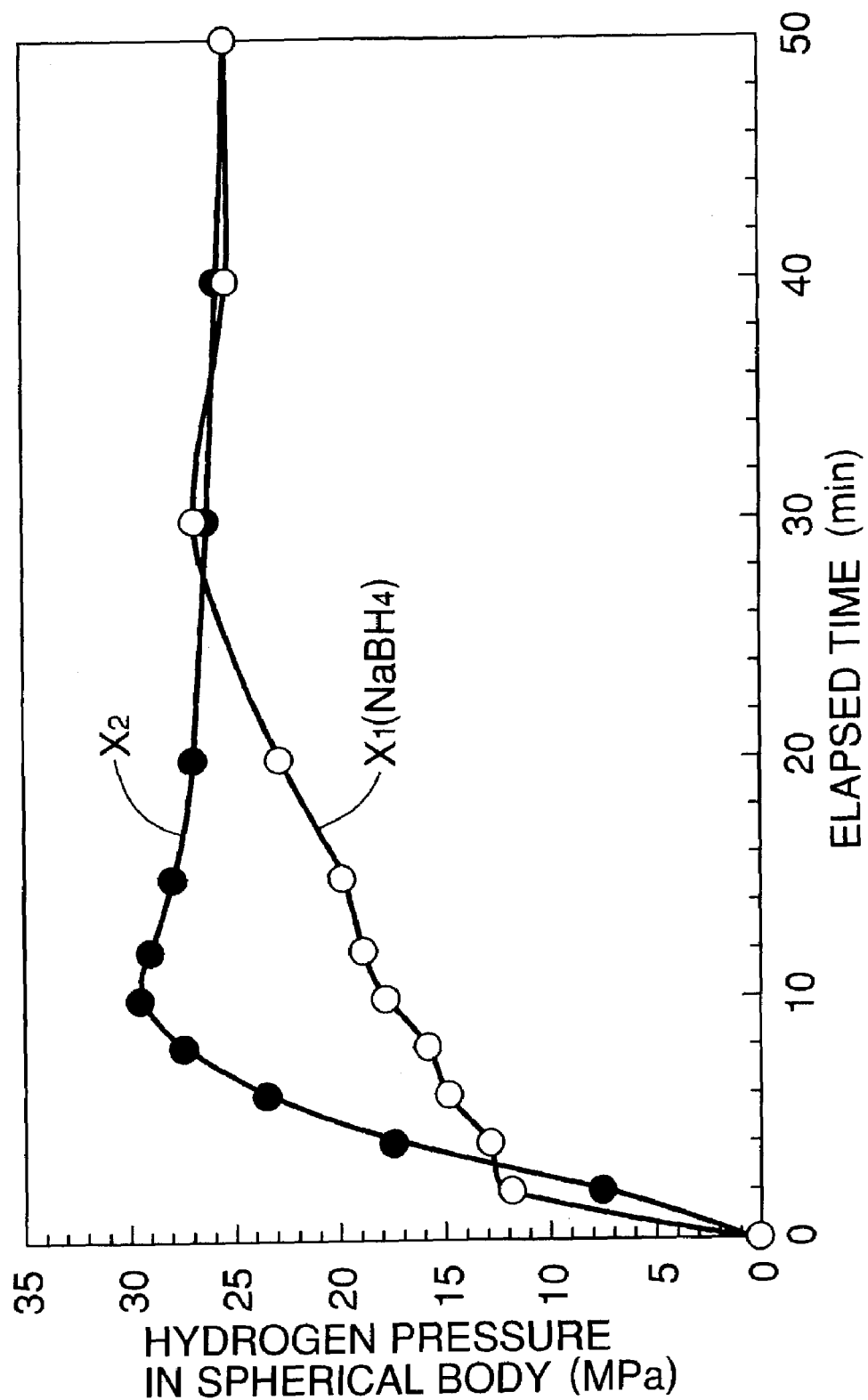

PROCESS FOR PRODUCING HIGH-PRESSURE HYDROGEN AND SYSTEM FOR PRODUCING HIGH-PRESSURE HYDROGEN

BACKGROUND OF THE INVENTION

1. Field of the Invention

The present invention relates to a process for producing high-pressure hydrogen, and a system for producing high-pressure hydrogen.

2. Description of the Related Art

To produce high-pressure hydrogen, a measure is conventionally employed, which comprises the steps of generating hydrogen having a pressure of about 0.008 to 3.2 MPa in a hydrogen generator, pressurizing the hydrogen from the hydrogen generator by a high-pressure compressor, and filling it into a hydrogen-storing vessel (see Japanese Patent Application Laid-open Nos. 9-266006 and 11-283633).

However, the high-pressure compressor generally has a low compression efficiency, and hence a great deal of energy is uneconomically required for obtaining high-pressure hydrogen.

SUMMARY OF THE INVENTION

Accordingly, it is an object of the present invention to provide an economical high-pressure hydrogen producing process capable of producing high-pressure hydrogen at a low cost by employing a very simple method.

To achieve the above object, according to the present invention, there is provided a process for producing high-pressure hydrogen, comprising the steps of: weighing water and a hydrogen-generating material which reacts with water to generate hydrogen so that a target high hydrogen pressure is generated in a high-pressure container; introducing said hydrogen-generating material and said water into said high-pressure container through its supply port; and closing said supply port, thereby causing a reaction between said hydrogen-generating material and said water, so that a hydrogen pressure generated in said high-pressure container reaches said target high hydrogen pressure.

With the above-described process, high-pressure hydrogen can be produced at a low cost by such a very simple method that the hydrogen-generating material and the water are weighed and introduced into the high-pressure container.

The hydrogen pressure achieved by the reaction between the hydrogen-generating material and the water depends on an amount of hydrogen generated at a reached temperature of the reaction, and is determined in an equilibrium theory. In general, an amount of hydrogen generated by the hydrogen-generating material which is highly active to water at about ambient temperature, does not greatly rely on the pressure in the container, and hence the hydrogen pressure reaches a pressure determined in the equilibrium theory. However, if the pressure in the container is sufficiently high during the reaction and an equilibrium reaction does not advantage, the hydrogen pressure does not reach a chemical stoichiometric pressure and is constant at an equilibrium pressure, and hence the unreacted hydrogen-generating material remains. Namely, the pressure in the container is kept constant until all the unreacted hydrogen-generating material reacts.

It is another object of the present invention to provide a high-pressure hydrogen producing system which is capable of producing high-pressure hydrogen at a low cost.

To achieve the above object, according to the present invention, there is provided a system for producing high-pressure hydrogen, comprising: a hydrogen generator into which water and a hydrogen-generating material which reacts with water to generate hydrogen are introduced, said hydrogen-generating material and said water being weighed so that hydrogen having a target high pressure is produced; a hydrogen-storing vessel for storing a high-pressure hydrogen generated by said hydrogen generator; and a connecting member adapted to connect said hydrogen generator and said hydrogen-storing vessel to each other in a course of filling said hydrogen-storing vessel with the high-pressure hydrogen and adapted to disconnect said hydrogen generator and said hydrogen-storing vessel from each other after said hydrogen-storing vessel is filled with the high-pressure hydrogen.

With the above-described system, the high-pressure hydrogen can be generated at a low cost by such a very simple method of weighing the hydrogen-generating material and the water and introducing them into the hydrogen generator. In addition, the hydrogen-storing vessel can be filled with the high-pressure hydrogen by connecting the hydrogen generator to the hydrogen-storing vessel through the connecting member, whereby the high-pressure hydrogen can be stored in the hydrogen-storing vessel. After the hydrogen-storing vessel is filled with the high-pressure hydrogen, the hydrogen generator is disconnected from the hydrogen-storing vessel. Therefore, when the hydrogen-storing vessel is transported or mounted on, for example, a vehicle including a fuel cell, there is obtained an advance in reducing the weight, because the weight of the hydrogen generator and the weight of a reaction product derived from the hydrogen-generating material and the water are eliminated.

The above and other objects, features and advantages of the invention will become apparent from the following description of the preferred embodiment taken in conjunction with the accompanying drawings.

BRIEF DESCRIPTION OF THE DRAWINGS

FIG. 13 is a graph of another example of the relationship between the elapsed time and the hydrogen pressure in the spherical body.

DESCRIPTION OF THE PREFERRED EMBODIMENTS

Embodiment I

Figure 1:
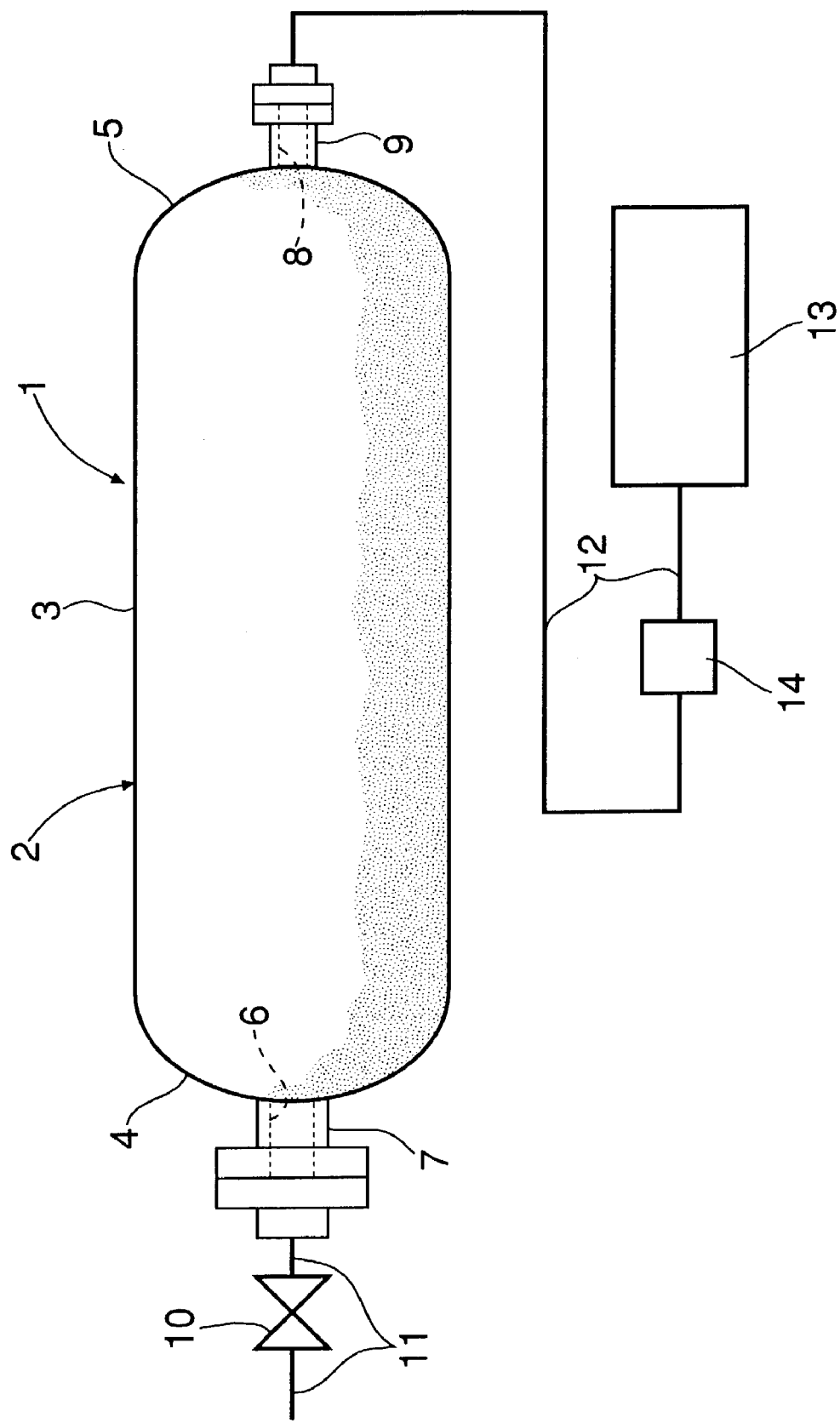
FIG. 1 is a diagram showing the connection between a high-pressure container and a fuel cell.
Figure 2:
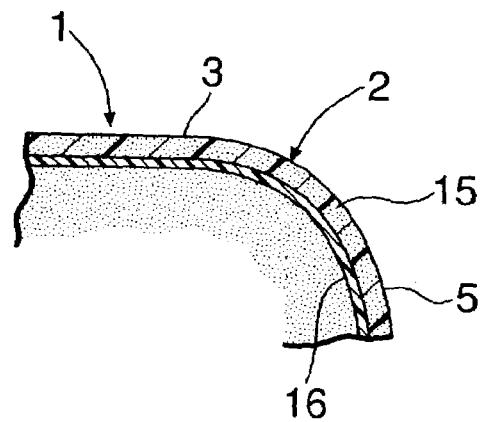
FIG. 2 is an enlarged sectional view of essential portions of the high-pressure container.

Referring to FIG. 1, a high-pressure container 1 is mounted on a vehicle and includes a container body 2 which has a cylindrical portion 3 and bowl-shaped end wall portions 4 and 5 connected to opposite ends of the cylindrical portion 3, respectively. A first connecting portion 7 having a supply port 6 protrudes from the bowl-shaped end wall portion 4, and a second connecting portion 9 having a discharge port 8 protrudes from the bowl-shaped end wall portion 5. A first pipe 11 having an on-off valve 10 is connected to the first connecting portion 7. The second connecting portion 9 is connected to a fuel cell 13 through a second pipe 12. A pressure-reducing device 14 having an on-off valve is mounted in the second pipe 12. As shown in FIG. 2, the container body 2 comprises an outer shell 15 made of a carbon composite material, and a liner 16 made of a high-density polyethylene and covering the entire inner surface of the outer shell 15.

If the on-off valve of the pressure-reducing device 14 is opened at the start of the operation of the fuel cell 13 in a state in which high-pressure hydrogen is filled in the high-pressure container 1, high-pressure hydrogen is supplied to the fuel cell 13 after reduction of the pressure thereof.

Figure 3:
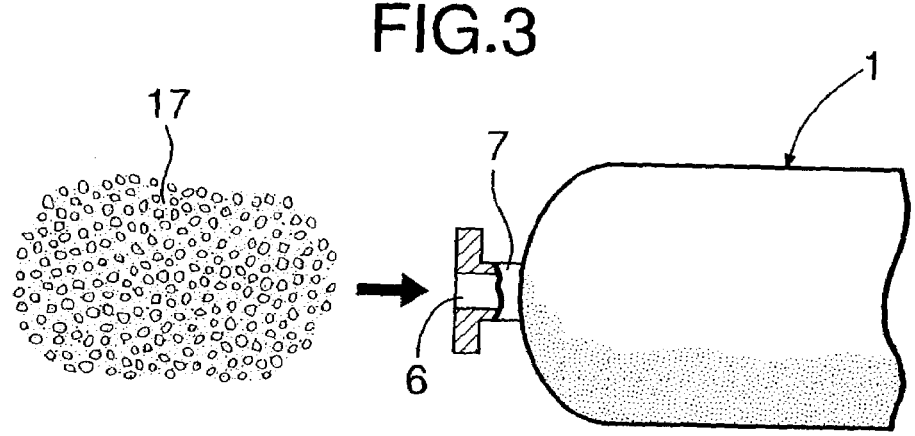
FIG. 3 is a diagram showing a state in which a hydrogen-generating material is introduced into the high-pressure container.
Figure 4:
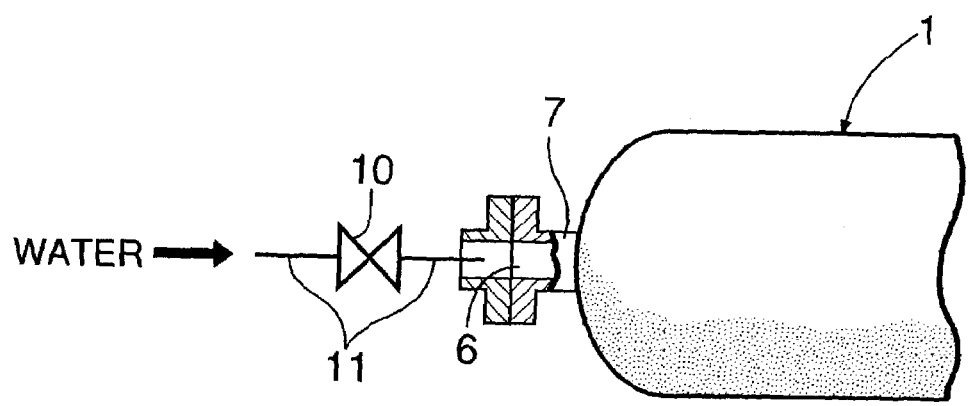
FIG. 4 is a diagram showing a state in which water is introduced into the high-pressure container.
Figure 5:
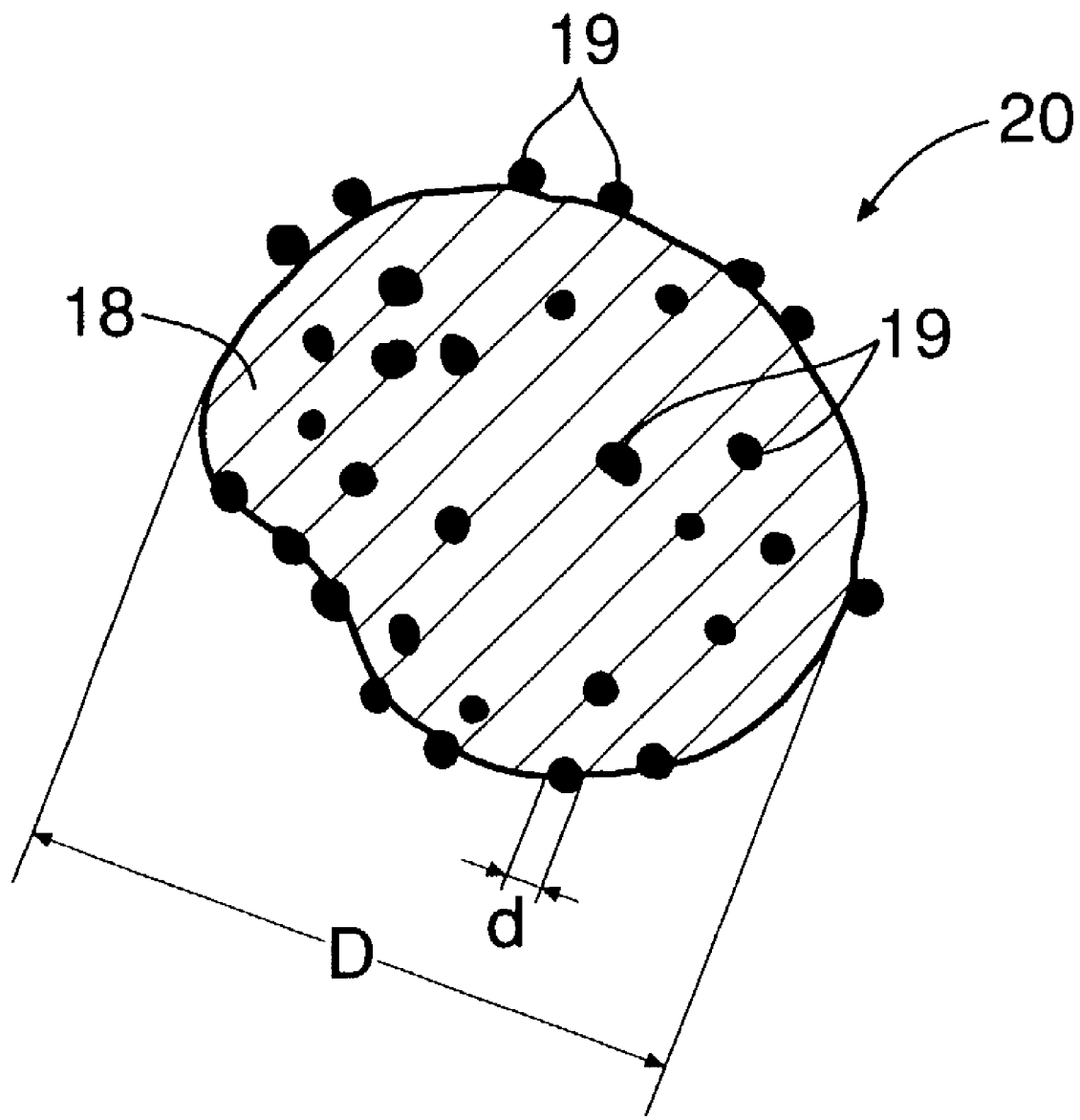
FIG. 5 is a diagram for explaining Mg alloy particles.

To produce high-pressure hydrogen, a powdery hydrogen-generating material which reacts with water to generate hydrogen and water are first weighed so that a target high hydrogen pressure is produced in the high-pressure container 1. Then, as shown in FIG. 3, the weighed powdery hydrogen-generating material 17 is placed into the high-pressure container 1 through the supply port 6 in a state in which the first pipe 11 is removed from the first connecting portion 7. Further, as shown in FIG. 4, the first pipe 11 is connected to the first connecting portion 7, and the weighed water is placed into the high-pressure container 1 through the supply port 6 in a state in which the on-off valve of the pressure-reducing device 14 is closed. Thereafter, the supply port 6 is closed by closing the on-off valve 10, whereby the hydrogen pressure in the high-pressure container 1 is increased to reach the target high hydrogen pressure by the reaction between the powdery hydrogen-generating material 17 and the water.

The powdery hydrogen-generating material 17 which may be used is an aggregate comprising at least one of Mg particles and hydrogenated Mg ($MgH_2$) particles, namely, an Mg powder, a hydrogenated Mg powder, or a mixture of an Mg powder and a hydrogenated Mg powder.

A hydrogenated Mg alloy powder may be also used as the hydrogen-generating material 17. The hydrogenated Mg alloy powder is a powder produced by hydrogenating an aggregate of Mg alloy particles 20 comprising Mg particles 18, and a plurality of catalyst metal fine particles 19 existing on a surface of each of the Mg particles 18 and within each of the Mg particles 18. The catalyst metal fine particles 19 is at least one selected from among Ni fine particles, Ni alloy fine particles, Fe fine particles, Fe alloy fine particles, V fine particles, V alloy fine particles, Mn fine particles, Mn alloy fine particles, Ti fine particles, Ti alloy fine particles, Cu fine particles, Cu alloy fine particles, Ag fine particles, Ag alloy fine particles, Ca fine particles, Ca alloy fine particles, Zn fine particles, Zn alloy fine particles, Zr fine particles, Zr alloy fine particles, Co fine particles, Co alloy fine particles, Cr fine particles, Cr alloy fine particles, Al fine particles and Al alloy fine particles.

The content G of the catalyst metal fine particles 19 in the Mg alloy powder is set in a range of 0.1% by atom $\leq G \leq 5.0\%$ by atom. If the content G is lower than 0.1% by atom, no effect is provided by the addition. On the other hand, if the content G is higher than 5.0% by atom, the amount of hydrogen generated is reduced, resulting in no practicality. The content G of the catalyst metal fine particles 19 is preferably in a range of 0.3% by atom $\leq G \leq 1.0\%$ by atom. The Mg alloy powder is produced by mechanical alloying, and hence it is appropriate that the particle size D of the Mg particles 18 is in a range of 1 $\mu m \leq D \leq 500$ $\mu m$, and the particle size d of the catalyst metal fine particles 19 is in a range of 10 nm $\leq d \leq 500$ nm. In this case, the particle sizes D and d are defined as the longest one (largest diameter) of diameters in each of the Mg particles, etc. in a microphotograph.

EXAMPLE OF PRODUCTION OF HIGH-PRESSURE HYDROGEN

High-pressure container 1: the inner diameter is 200 mm; the tower length is 800 mm; the volume is about 100 liters; and a target hydrogen pressure is 27 MPa. Hydrogen-generating material 17: an alloy powder has a composition of $Mg_{99.5}Ni_{0.5}$ (unit of numerical value is % by atom); a particle size D of Mg particles 18 is in a range of 2 $\mu m \leq D \leq 300$ $\mu m$; a particle size d of Ni particles is in a range of 10 nm $\leq d \leq 200$ nm; the supply amount is 15 kg. Water: an ion-exchanged water at 40° C. supplied in an amount of 25 liters.

Figure 6:
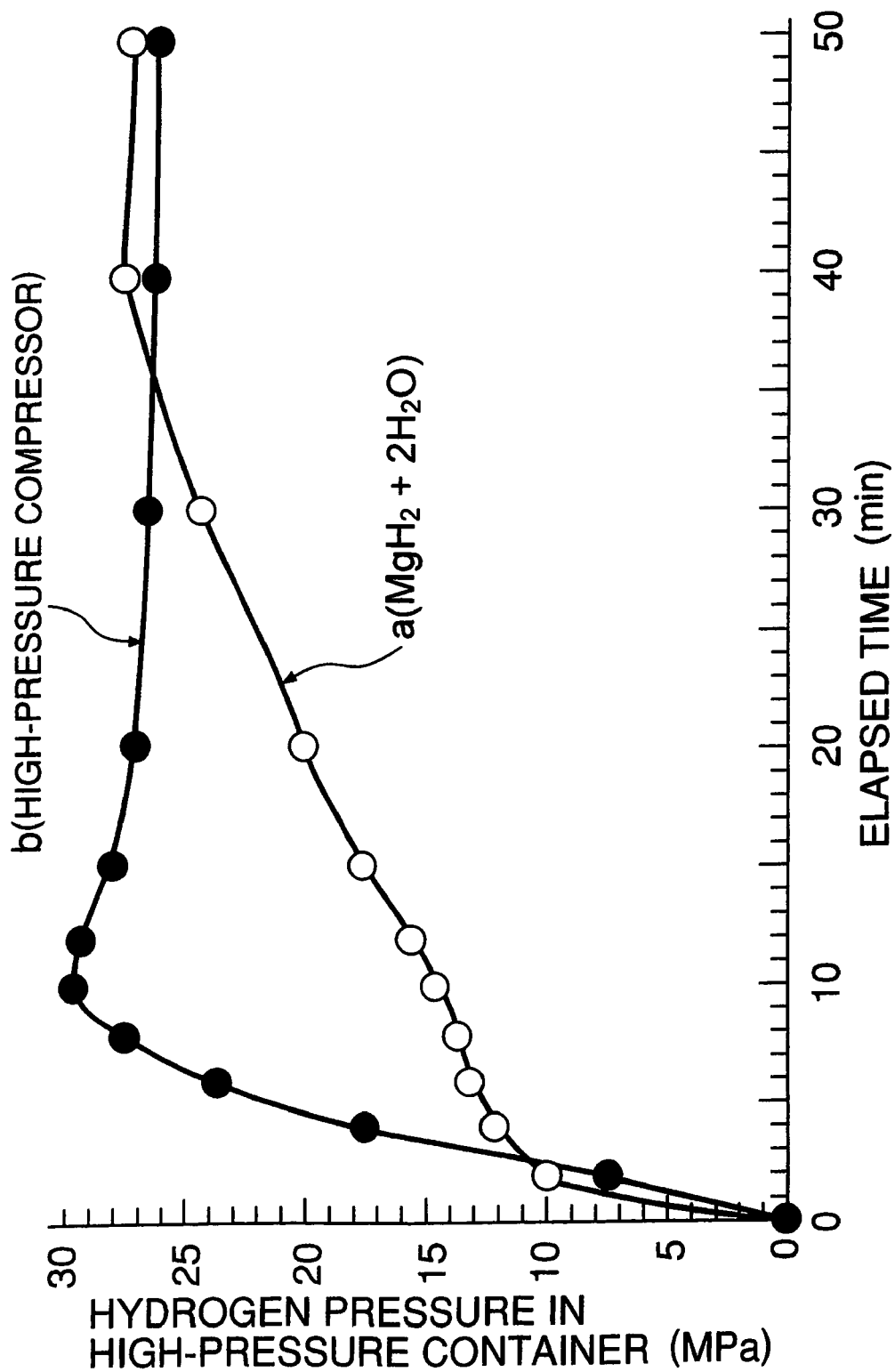
FIG. 6 is a graph showing the relationship between the elapsed time and the hydrogen pressure in the high-pressure container.

A line a in FIG. 6 shows a change with time in hydrogen pressure produced by a reaction between the alloy powder and the water in the high-pressure container 1, namely, $MgH_2 + 2H_2O \rightarrow Mg(OH)_2 + 2H_2$. A line b in FIG. 6 corresponds to a case where hydrogen was filled in the high-pressure container 1 by a high-pressure compressor. As apparent from the line a in FIG. 6, a high hydrogen pressure equivalent to that when the high-pressure compressor is used, can be produced without use of the high-pressure compressor by using the hydrogen-generating material and the water as described above.

$Mg(OH)_2$ remaining in the high-pressure container 1 is discharged from the supply port 6, and the recovery of Mg is carried out.

As can be seen from FIG. 6, a hydrogen pressure of about 10 MPa in the high-pressure container 1 suffices to operate the fuel cell 13 in order to cause the vehicle to travel. Therefore, the vehicle can be started within a very short time such as about 2 minutes after introduction of water into the high-pressure container 1. Thereafter, the generation of hydrogen is continued until the hydrogen-generating material is used up, and hence the traveling of the vehicle is conducted without any problem.

If the high-pressure compressor is used, the vehicle cannot be started before the filling of hydrogen into the high-pressure container is finished. Namely, the filling of hydrogen is not finished unless about 10 minutes is elapsed from the start of the filling of hydrogen in the line b in FIG. 6, and hence the driver must wait a time to start the vehicle, before the filling of hydrogen is finished.

In order to shorten the hydrogen-filling time, there is conceived a process for filling hydrogen into the high-pressure container 1 mounted on the vehicle, which can be considered is a measure which comprises filling hydrogen into a buffer tank by a high-pressure compressor in a hydrogen station and transferring the high-pressure hydrogen in the buffer tank into the high-pressure container mounted on the vehicle. In this case, however, the hydrogen pressure in the buffer tank must be larger than that in the high-pressure container 1, and hence a great deal of energy is required for filling hydrogen into the buffer tank. In addition, a cascade-type filling system comprising a plurality of buffer tanks entails disadvantages such as an increase in size of the system and an increase in area for installation of the system. According to the present invention, all these problems are eliminated.

Embodiment II

Figure 7:
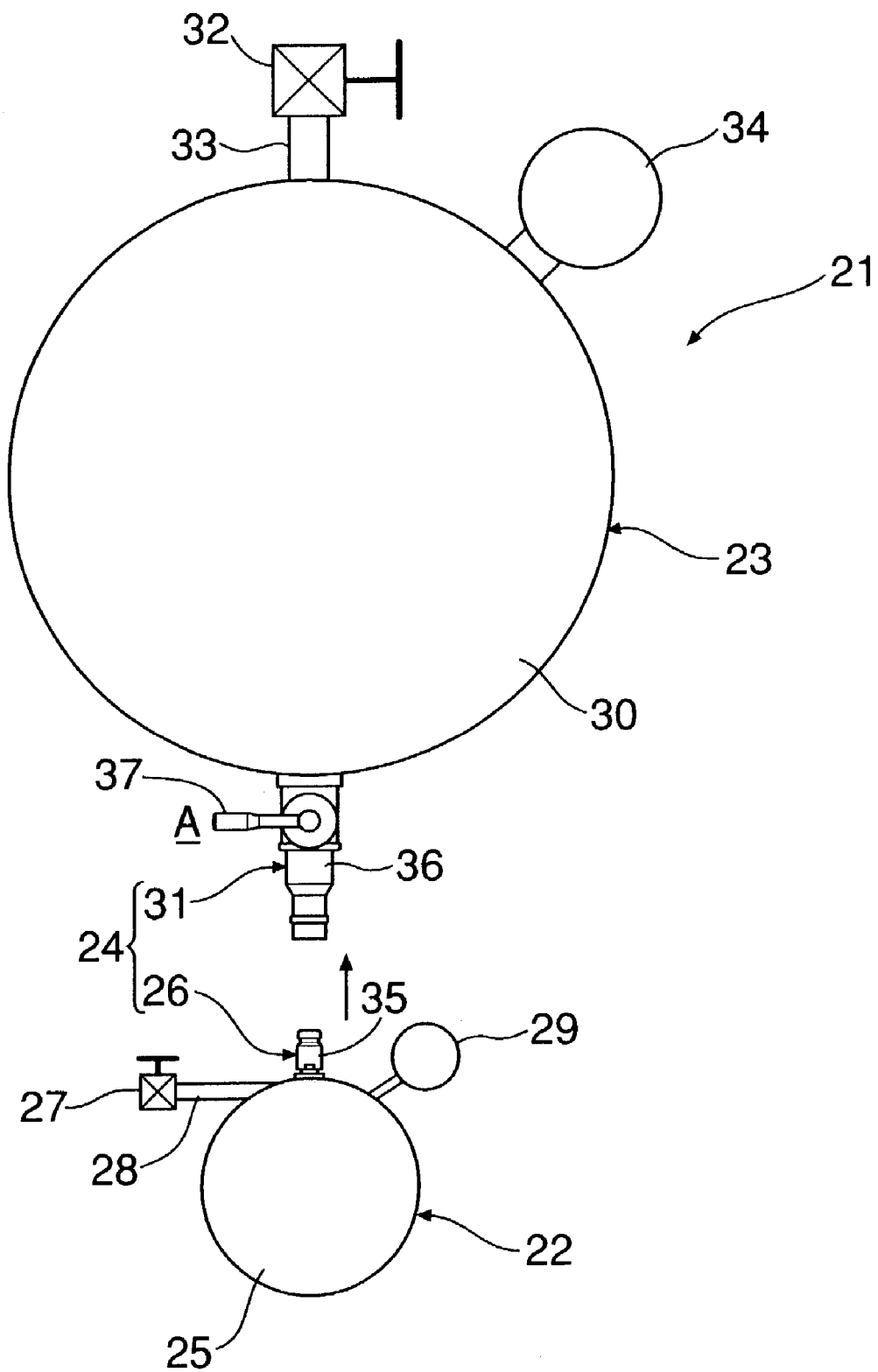
FIG. 7 is a front view of a high-pressure hydrogen producing system in a state in which a hydrogen-storing vessel and a hydrogen generator are disconnected from each other before introduction of hydrogen into the hydrogen-storing vessel.
Figure 8:
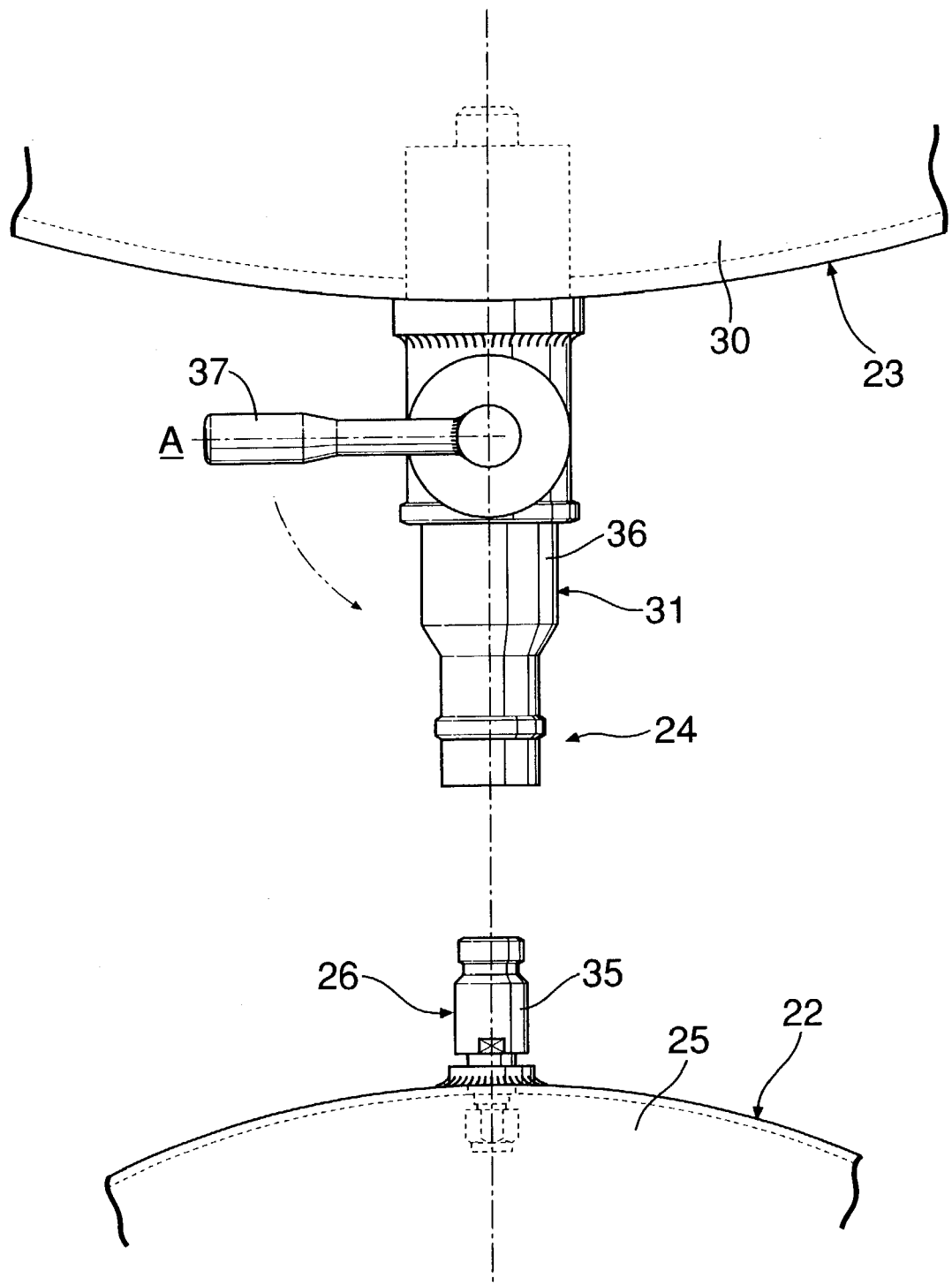
FIG. 8 is an enlarged view of essential portions of FIG. 7.

Referring to FIGS. 7 and 8, a high-pressure producing system 21 includes a hydrogen generator 22, a hydrogen-storing vessel 23, and a connecting member 24 adapted to connect and disconnect the hydrogen generator 22 and the hydrogen-storing vessel 23 to and from each other. The hydrogen generator 22 has a spherical body 25, which is provided with a first half 26 of the connecting member 24, a water-introducing pipe 28 having an on-off valve 27, and a pressure indicator 29. The hydrogen-storing vessel 23 has a spherical body 30 having a diameter larger than that of the spherical body 25 of the hydrogen generator 22. The spherical body 30 is provided with a second half 31 of the connecting member 24, a hydrogen discharge pipe 33 having an on-off valve 32, and a pressure indicator 34.

A hydrogen-generating material which reacts with water to generate hydrogen and the water are weighed and introduced into the spherical body 25 of the hydrogen generator 22 so that a target high-pressure hydrogen is generated. Example of the hydrogen-generating material, which may be used, are at least one powder or granular material of metal selected from among NaH, Na, $NaBH_4$, $MgH_2$, Mg, $Mg(BH_4)_2$, $Mg(AlH_4)_2$, LiH, $LiAlH_4$, $LiBH_4$, Li, K, Ca, Sr and Be. The hydrogen-generating material is introduced into the spherical body 25 by opening a regularly-closed valve (not shown) mounted in a cylindrical main body 35 of the first half 26, and thereafter the regularly-closed valve is automatically closed. On the other hand, the water is introduced into the spherical body 25 through the water-introducing pipe 28 by opening the on-off valve 27 and thereafter, the on-off valve 27 is closed.

Thus, hydrogen is generated in the spherical body 25. It is desirable that the spherical body 25 is cooled during generation of hydrogen.

In the hydrogen-storing vessel 23, the second half 31 of the connecting member 24 includes a cylindrical main body 36, and an operating lever 37 mounted on an outer surface of the main body 36. When the operating lever 37 is in one of positions in which its axis intersects an axis of the cylindrical main body 36, e.g., a first position A on the left of the cylindrical main body 36 as shown in FIGS. 7 and 8, an on-off valve (not shown) in the cylindrical main body 36 is in a state in which it is closed and cannot be connected to the first half 26. On the other hand, when the operating lever 37 is turned in a counterclockwise direction from the first position A and retained in the other position in which its axis intersects an axis of the cylindrical main body 36, namely, in a second position B on the right of the cylindrical main body 36 in FIGS. 9 and 10 in a state in which the cylindrical main body 35 of the first half 26 has been fitted into the cylindrical main body 36 of the second half 31, the first half 26 is connected to the second half 31, and the regularly-closed valve and the on-off valve in the cylindrical main bodies 35 and 36 are opened, whereby the spherical bodies 25 and 30 are put into communication with each other.

Thus, hydrogen is introduced from inside the spherical body 25 of the hydrogen generator 22 into the spherical body 30 of the hydrogen-storing vessel 23, whereby the interior of the spherical body 30 is filled with the high-pressure hydrogen.

Figure 9:
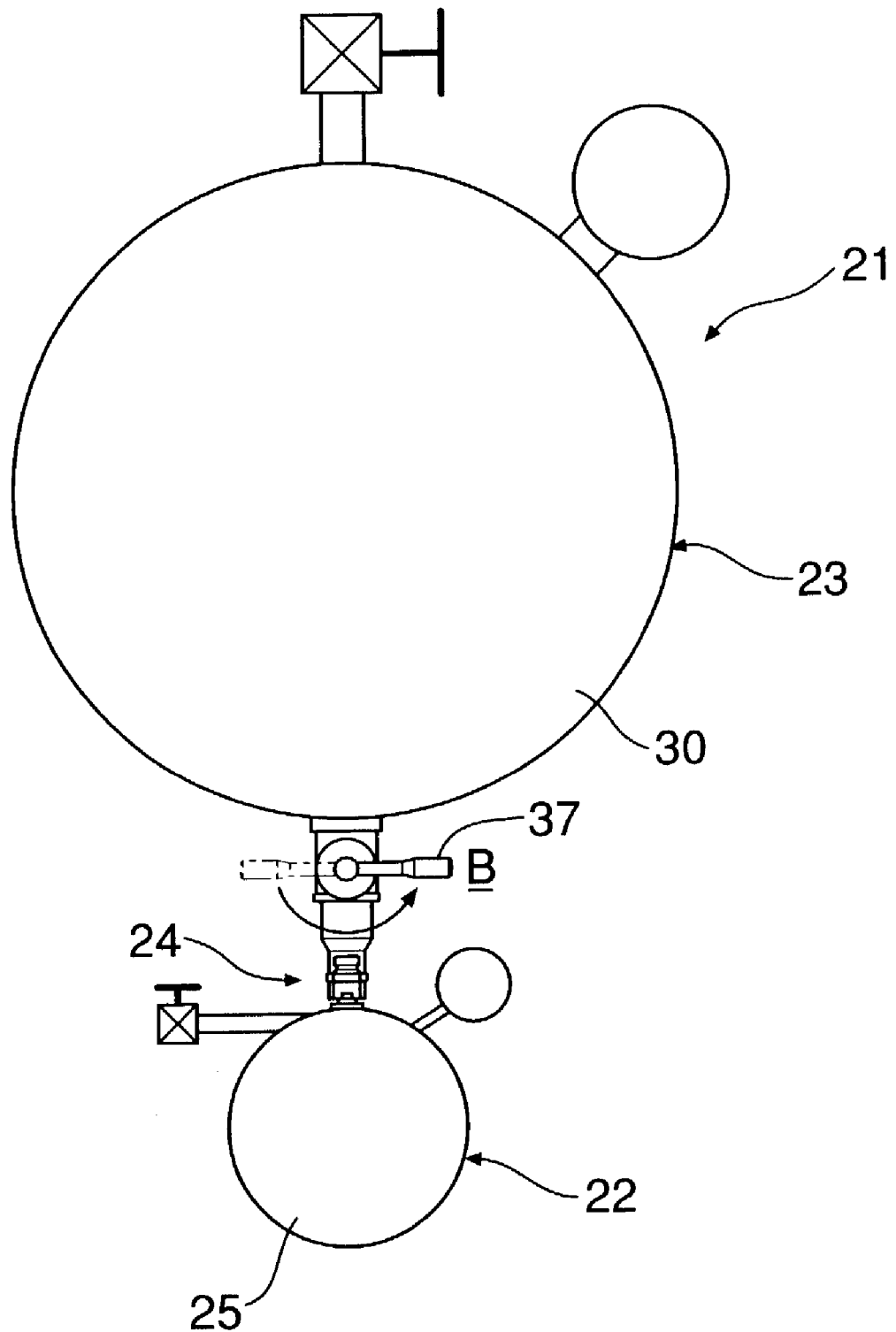
FIG. 9 is a front view of the high-pressure hydrogen producing system in a state in which the hydrogen-storing vessel and the hydrogen generator are connected to each other, and hydrogen is being introduced into the hydrogen-storing vessel.
Figure 10:
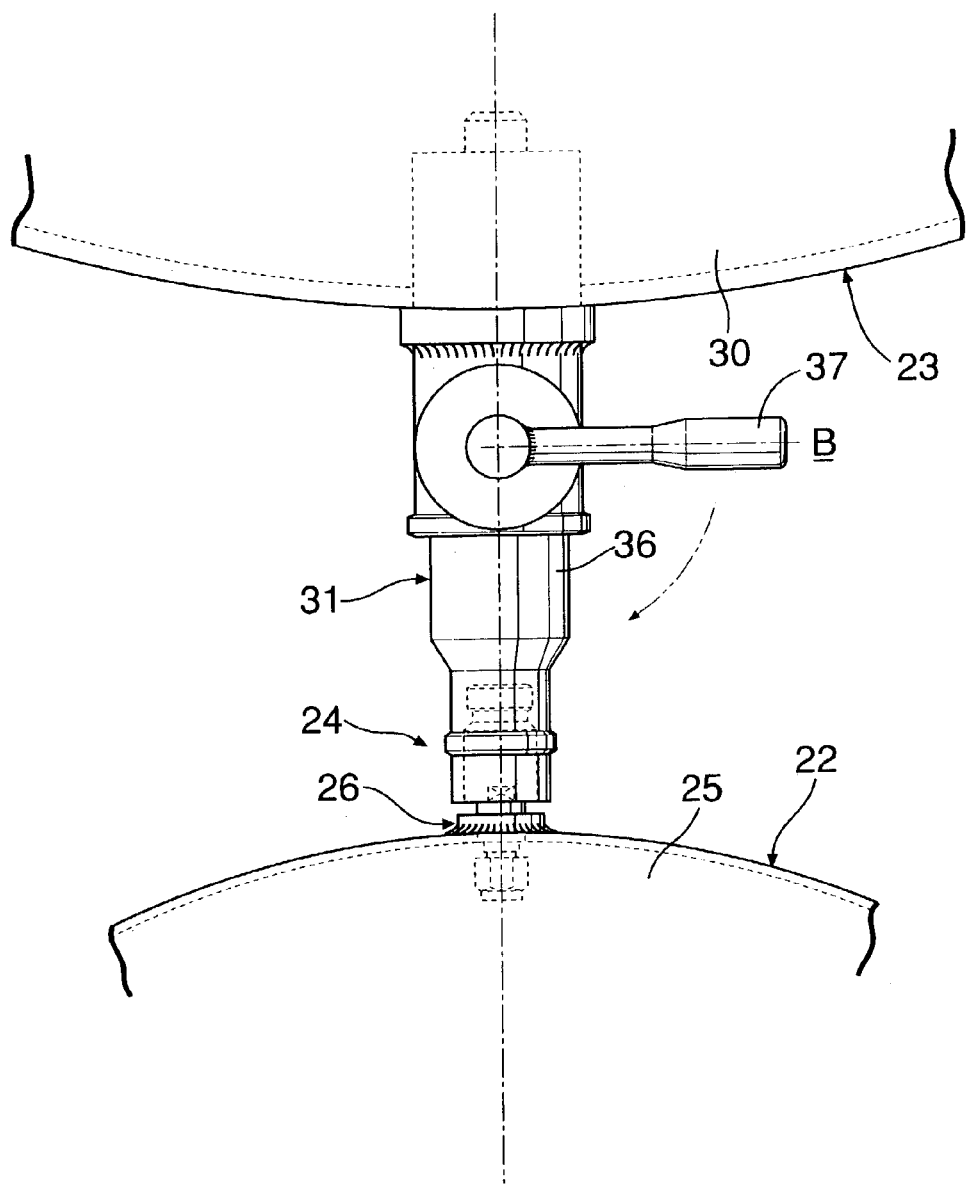
FIG. 10 is an enlarged view of essential portions of FIG. 9.
Figure 11:
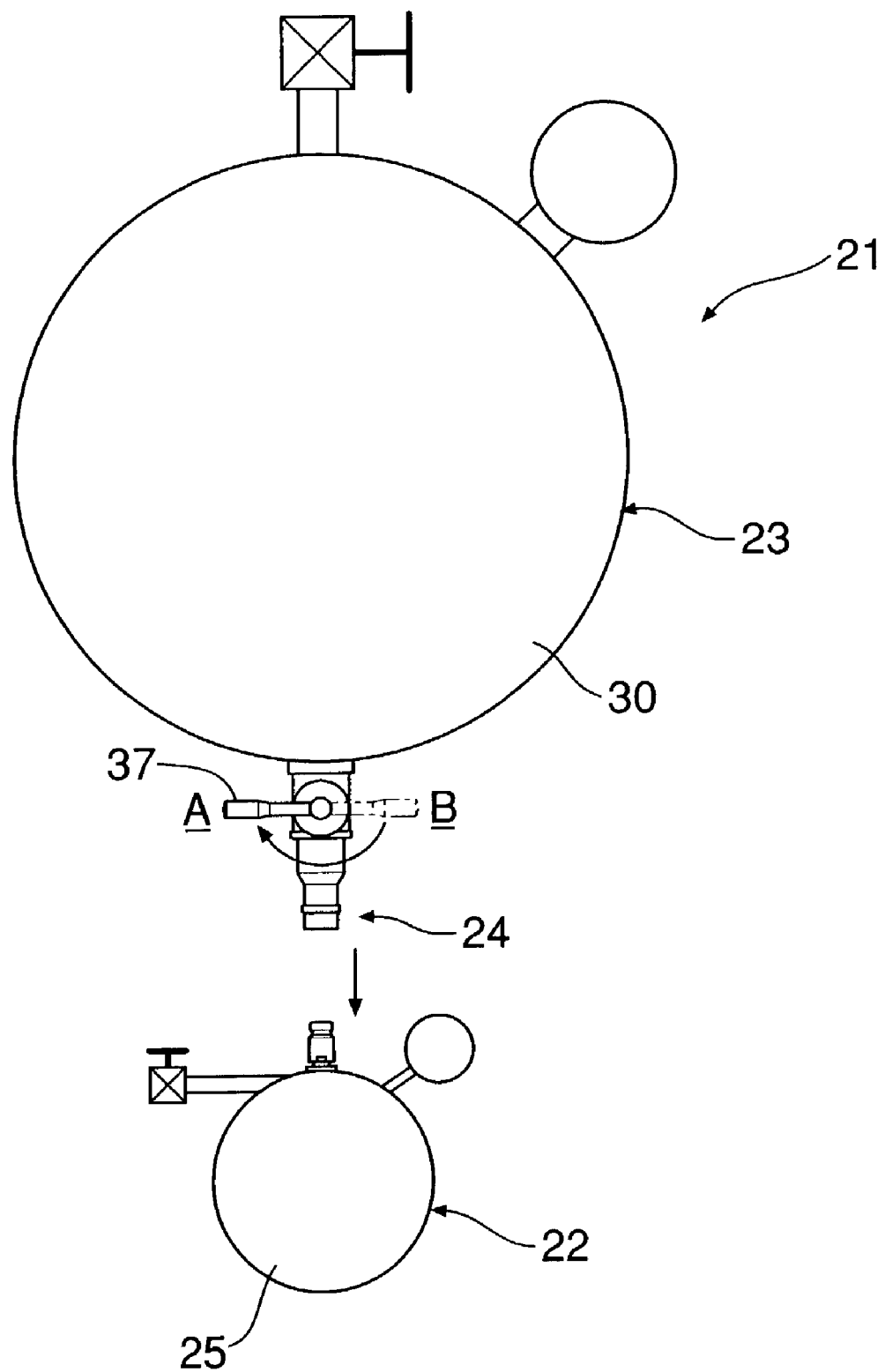
FIG. 11 is a front view of the high-pressure hydrogen producing system in a state in which the hydrogen-storing vessel and the hydrogen generator are disconnected from each other after filling the hydrogen-storing vessel with high-pressure hydrogen.

When the operating lever 37 located in the second position B in FIGS. 9 and 10 is turned in a clockwise direction and retained in the first position A as shown in FIG. 11, the hydrogen generator 22 is disconnected from the hydrogen-storing vessel 23, whereby the high-pressure hydrogen is stored in the spherical body 30 of the hydrogen-storing vessel 23, and the regularly-closed valve of the first half 26 and the on-off valve of the second half 31 are closed.

In this way, after the interior of the spherical body 30 of the hydrogen-storing vessel 23 is filled with the high-pressure hydrogen, the hydrogen generator 22 is disconnected from the hydrogen-storing vessel 23. Therefore, when the hydrogen-storing vessel 23 is mounted, for example, on a vehicle including a fuel cell, there is obtained an advantage in reducing the weight, because the weight of the hydrogen generator 22 and the weight of a reaction product derived from the hydrogen-generating material and the water are eliminated.

The reaction product derived from the water and the hydrogen-generating material is discharged out of the spherical body 25 through the cylindrical main body 35 of the first half 26.

Example 1 of Production of High-Pressure Hydrogen

A powder of $MgH_2$ was introduced in an amount of 100 g into a spherical body 25 made of an Al alloy and having a volume of 300 cc in the hydrogen generator 22, and water was introduced in an amount of 150 cc into the spherical body 25. Thereafter, the hydrogen generator 22 was connected to the hydrogen-storing vessel 23 through the connecting member 24. A chemical reaction represented by $MgH_2 + 2H_2O \rightarrow Mg(OH)_2 + 2H_2$ occurred within the spherical body 25 of the hydrogen generator 22 to generate hydrogen. This hydrogen was introduced into a spherical body 30 made of an Al alloy and having a volume of 1,000 cc in the hydrogen-storing vessel 23. After lapse of about 1 hour, the hydrogen pressure in the spherical body 30 reached 13 MPa, and when the hydrogen pressure did not rise further, the hydrogen generator 22 was disconnected from the hydrogen-storing vessel 23.

In this case, the total weight of the hydrogen-storing vessel 23 including the weight of the high-pressure hydrogen in an amount of 1,000 cc was 1,922 g, and the entire volume of the hydrogen-storing vessel 23 was 1,704 $cm^3$. For example, if an attempt is made to introduce a powder of $MgH_2$ and water in amounts equal to those described above into a spherical body 25 made of an Al alloy and having a volume of 1,300 cc in a hydrogen-storing vessel also serving as a hydrogen generator, to thereby produce high-pressure hydrogen of 13 MPa, the total weight of the hydrogen-storing vessel including the weights of the high-pressure hydrogen and a reaction product is 2,676 g, and the entire volume of the hydrogen-storing vessel is 2,216 cm³. Therefore, the meaning of the arrangement such that the hydrogen generator 22 is capable of being disconnected from the hydrogen-storing vessel 23 for the purpose of reduction in weight, is obvious. In the chemical reaction, the reaction rate can be increased using a catalyst.

Example 2 of Production of High-Pressure Hydrogen

A granular material of NaH having a particle size in a range of 1.0 to 5.0 mm was introduced in an amount of 290 g into a spherical body 25 made of an Al alloy and having a volume of 1,000 cc in the hydrogen generator 22, and ion-exchanged water at 40° C. was then introduced in an amount of 250 cc into the spherical body 25. Thus, a chemical reaction represented by $NaH+H_2O \rightarrow NaOH+H_2$ occurred to produce hydrogen. In this case, a catalyst is not required, because NaOH has a very high reactivity with water.

Figure 12:
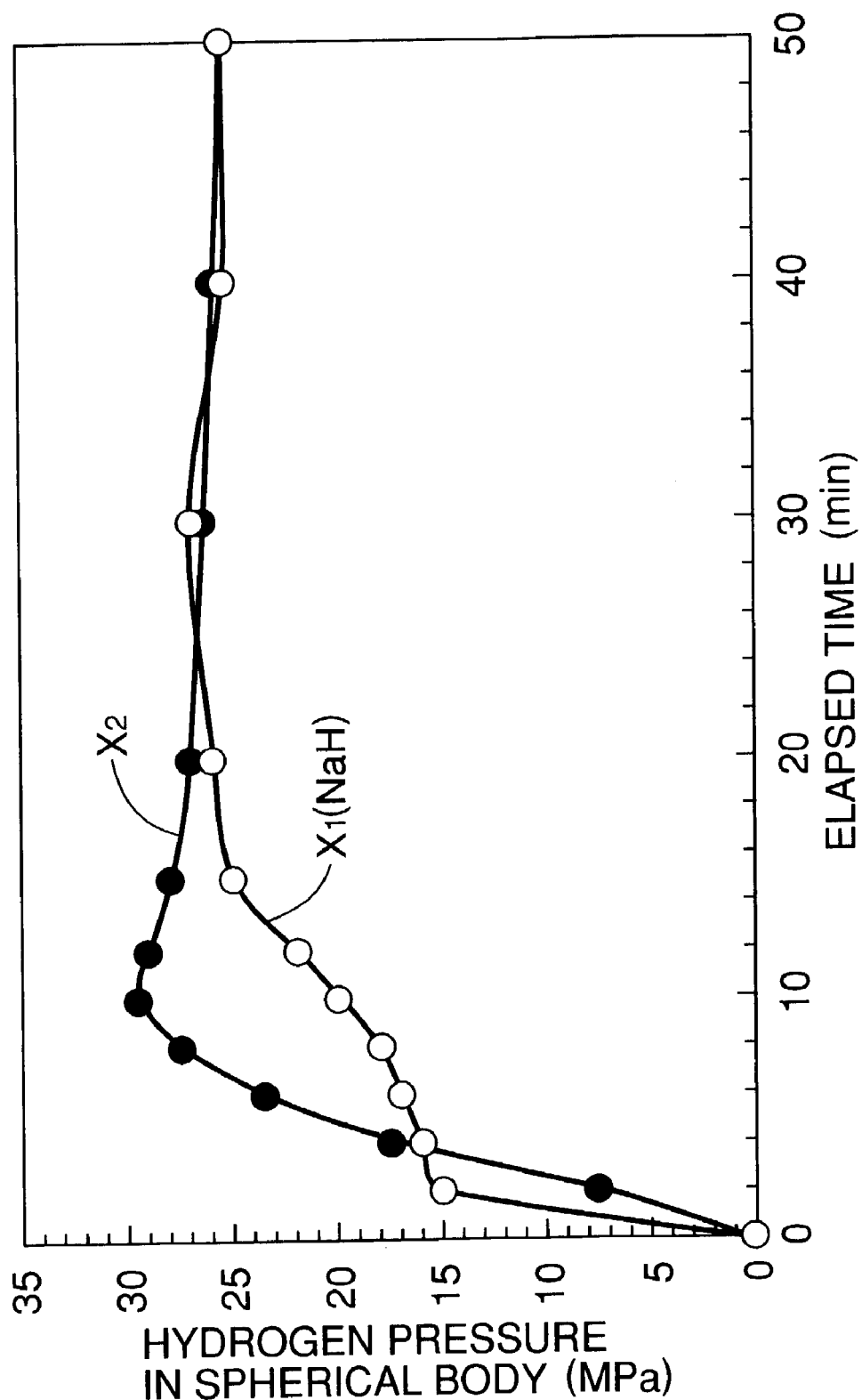
FIG. 12 is a graph of one example of the relationship between the elapsed time and the hydrogen pressure in a spherical body.

A change with time in hydrogen pressure in the spherical body 25 was examined to provide a result indicated by a line $X_1$ in FIG. 12. In FIG. 12, a line $X_2$ indicates a case where a high-pressure compressor was used.

As apparent from FIG. 12, a high-pressure hydrogen as in the case where the high-pressure compressor is used, can be produced by using the hydrogen generator 22.

Example 3 of Production of High-Pressure Hydrogen

A granular material of $NaBH_4$ having a particle size in a range of 1.0 to 5.0 mm was introduced in an amount of 114 g into a spherical body 25 made of an Al alloy and having a volume of 1,000 cc in the hydrogen generator 22, and ion-exchanged water at 40° C. was then introduced in an amount of 250 cc into the spherical body 25. Thus, a chemical reaction represented by $NaBH_4+6H_2O \rightarrow NaBO_2 \cdot 4H_2O+4H_2$ occurred to produce hydrogen. In this case, a catalyst is not required, because $NaBH_4$ has a very high reactivity with water.

A change with time in hydrogen pressure in the spherical body 25 was examined to provide a result indicated by a line $X_1$ in FIG. 13. In FIG. 13, a line $X_2$ indicates a case where a high-pressure compressor was used.

As apparent from FIG. 13, a high-pressure hydrogen as in the case where the high-pressure compressor is used can be produced by using the hydrogen generator 22.

Although the embodiments of the present invention have been described in detail, it will be understood that the present invention is not limited to the above-described embodiments, and various modifications in design may be made without departing from the spirit and scope of the invention defined in the claims.

What is claimed is:

1. A process for producing high-pressure hydrogen, comprising the steps of: weighing water and a hydrogen-generating material which reacts with water to generate hydrogen so that a target high hydrogen pressure is generated in a high-pressure container; introducing said hydrogen-generating material and said water into said high-pressure container through its supply port; closing said supply port, and reacting said hydrogen-generating material and said water, so that a hydrogen pressure generated in said high-pressure container reaches said target high hydrogen pressure, and is kept constant until all of the hydrogen-generating material is reacted.

2. A process for producing high-pressure hydrogen according to claim 1, wherein said hydrogen-generating material is an aggregate comprising at least one of Mg particles or hydrogenated Mg particles.

3. A process for producing high-pressure hydrogen according to claim 1, wherein said hydrogen-generating material is a material produced by hydrogenating an aggregate of Mg alloy particles comprising Mg particles and a plurality of catalyst metal fine particles existing on a surface of each of the Mg particles and within each of the Mg particles, said catalyst metal fine particles being at least one selected from the group consisting of Ni fine particles, Ni alloy fine particles, Fe fine particles, Fe alloy fine particles, V fine particles, V alloy fine particles, Mn fine particles, Mn alloy fine particles, Ti fine particles, Ti alloy fine particles, Cu fine particles, Cu alloy fine particles, Ag fine particles, Ag alloy fine particles, Ca fine particles, Ca alloy fine particles, Zn fine particles, Zn alloy fine particles, Zr fine particles, Zr alloy fine particles, Al fine particles and Al alloy fine particles.

* * * * *